United States Patent [19]

Valone

[11] Patent Number: 4,867,888

[45] Date of Patent: * Sep. 19, 1989

[54] CORROSION INHIBITING SYSTEM CONTAINING ALKOXYLATED ALKYLPHENOL AMINES

[75] Inventor: Frederick W. Valone, Houston, Tex.

[73] Assignee: Texaco Inc., White Plains, N.Y.

[*] Notice: The portion of the term of this patent subsequent to Jan. 13, 2004 has been disclaimed.

[21] Appl. No.: 137,646

[22] Filed: Dec. 24, 1987

[51] Int. Cl.$^4$ .............. E21B 41/02; C23F 11/04
[52] U.S. Cl. .................. 252/8.555; 252/8.552;
    252/392; 422/16; 564/347
[58] Field of Search ........... 252/8.555, 8.552, 392;
    422/16; 564/347

[56] References Cited

U.S. PATENT DOCUMENTS

| | | | |
|---|---|---|---|
| 2,229,024 | 1/1941 | Bruson . | |
| 3,038,856 | 6/1962 | Milligan | 252/8.555 |
| 3,203,904 | 8/1965 | Brown | 252/392 |
| 3,404,165 | 10/1968 | Budde et al. | 252/8.555 |
| 4,171,279 | 10/1979 | Martin | 252/392 X |
| 4,420,414 | 12/1983 | Valone | 252/392 |
| 4,552,686 | 11/1985 | Morris et al. | 252/392 |
| 4,636,256 | 1/1987 | Valone | 252/8.555 X |
| 4,650,865 | 3/1987 | Lange et al. | 564/348 X |

Primary Examiner—John F. Terapane
Assistant Examiner—Gary Geist
Attorney, Agent, or Firm—Jack H. Park; Kenneth R. Priem; Harold J. Delhommer

[57] ABSTRACT

A series of water-soluble, or at least water-dispersible, corrosion inhibiting solutions are disclosed which contain about 2 ppm to about 70%, preferably about 3 ppm to about 200 ppm, of an ethoxylated, propoxylated alkylphenol amine represented by the formula:

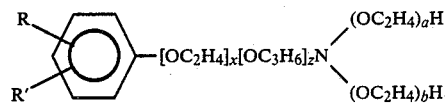

wherein R is hydrogen or an alkyl group containing about 5 to about 12 carbon atoms, R' is an alkyl group containing about 5 to about 12 carbon atoms, x equals about 1 to about 20, z equals about 1 to about 20, a equals about 1 to about 20, and b equals about 1 to about 20. The salt reaction products of the instant alkoxylated amine and an organic acid selected from the group consisting of hydroxyacetic acid, a fatty acid, a dicarboxylic acid, a dimer-trimer acid, an acidic phosphorus containing compound, and mixtures thereof are also effective in controlling sour and sweet corrosion. A method is also disclosed for protecting metal from corrosion by contacting the metal with an effective amount of the amine or the amine/acid reaction products, in a continuous or batch treatment.

34 Claims, No Drawings

CORROSION INHIBITING SYSTEM CONTAINING ALKOXYLATED ALKYLPHENOL AMINES

BACKGROUND OF THE INVENTION

The invention relates to organic inhibitor treating solutions and a method for using such solutions to reduce corrosion from the harsh fluid environments encountered in the oil field. More particularly, the invention concerns treating solutions containing an ethoxylated, propoxylated alkylphenol amine, which are effective in reducing sweet and sour corrosion.

Corrosion that occurs in an oil field environment is extremely complex and tends to attack all manner of metal equipment above and below ground. The principle corrosive agents found in the well fluids include hydrogen sulfide, carbon dioxide, oxygen, organic acids and solubilized salts. These agents may be present individually or in combination with each other. Valves, fittings, tubing, pumps, precipitators, pipelines, sucker rods, and other producing equipment are particularly susceptible. Deposits of rust, scale, corrosion by-products, paraffin and other substances create ideal environments for concentration cells. Carbon dioxide and hydrogen sulfide induced pitting is encouraged by such deposits. Acidic condensate that collects on metal tubing will also cause pitting. Extreme temperatures and pressures in downhole environments further accelerate corrosion.

Very often as oil fields mature and enhanced recovery methods such as water flooding and miscible flooding are instituted, the concentrations of hydrogen sulfide and carbon dioxide in the well fluids increase dramatically. This increase in concentration and the resultant increase in sweet corrosion or sour corrosion may make older oil fields economically unattractive due to excessive corrosion costs.

Various surfactants have been employed for many years to inhibit corrosion or to improve the performance of certain organic corrosion inhibitor systems. Surfactants are generally added to inhibitor systems to perform the different functions of (1) solubilizing the corrosion inhibitor or other active ingredients, (2) clean the surface of the metal to be protected or treated, and (3) improving the penetration of the active ingredients into the microscopic pores of the metal.

Ethoxylated alcohols and ethoxylated amines of various structures are common sufactants employed in corrosion inhibition systems. Six examples of such surfactant compounds are provided by U.S. Pat. Nos. 3,038,856; 3,110,683; 3,310,496; 3,623,979; 4,435,361 and 4,420,414. No. 3,110,683 discloses a series of alkylated, halogenated, sulfonated, diphenyl oxides and No. 3,623,979 discloses a series of imidazolinyl plymeric acid amides. The use of dicyclopentadiene sulfonate salts is disclosed in 4,435,361. Ethoxylated tertiary amines represented by the formula

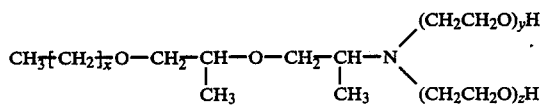

wherein x is about 9–11 and the sum of (y+z) is 2–50 are described and claimed in No. 4,420,414. The latter four of the above corrosion inhibition patents disclose oil-dispersible inhibiting systems which form a film over the metal parts to be treated. They are not water soluble systems.

A water-dispersible corrosion inhibiting system disclosed in U.S. Pat. No. 4,636,256 contains ethoxylated propoxylated alkylphenol amines of the formula

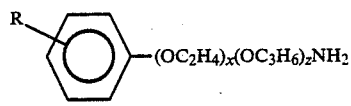

wherein R is an alkyl chain with 5 to 12 carbon atoms, x is 3 to 15 and z is 2 to 10.

A copending patent application, Ser. No. 07/136,064, filed Dec. 21, 1987, also discloses the use of an oil soluble to water-dispersible corrosion inhibiting system with alkoxylated alkylphenol amines. It teaches the use of amines with the formula

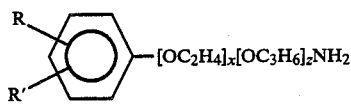

wherein R and R' are alkyl chains containing about 5 to about 12 carbon atoms, x equals about 1 to 10, and z equals about 2 to 20.

SUMMARY OF THE INVENTION

A series of water soluble, or water-dispersible corrosion inhibiting solutions are disclosed which contain an ethoxylated, propoxylated alkylphenol amine represented by the formula

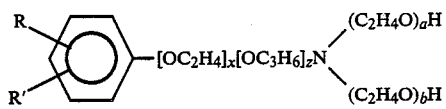

wherein R is hydrogen or an alkyl group containing about 5 to about 12 carbon atoms, R' is an alkyl group containing about 5 to about 12 carbon atoms, x equals about 1 to about 20, z equals about 1 to about 20, a equals about 1 to about 20, and b equals about 2 to about 20. It has been discovered that the use of these particular alkoxylated alkylphenol amines dramatically reduces oil field corrosion rates.

A preferred corrosion inhibiting solution of the invention contains about 2 ppm to about 70% by volume of the alkoxylated alkylphenol amine in a solvent which may be water, brine, an organic solvent such as alcohol or mixtures of organic solvent and water. The alkoxylated alkylphenol amine may be used in a continuous treatment wherein the metal to be protected from corrosion is contacted with about 3 to about 200 ppm of the amine in a continuous treatment or in a batch treatment with higher concentration levels. The amine can be stored and shipped in solutions with concentrations ranging up to and greater than 70% alkoxylated alkylphenol amine by volume.

It is most preferred to react the alkoxylated alkylphenol amine with an organic acid selected from the group consisting of hydroxyacetic acid, a fatty acid, a dicarboxylic acid, a dimer-trimer acid, an acidic phosphorus containing compound, and mixtures thereof to form a salt and then use that salt in a continuous exposure treatment. Simple mineral acids may be substituted for the organic acid, but results may not be as good. Unless otherwise noted, it should be presumed that a discussion of either the acid/amine reaction product or the amine will also apply to the other. Of course, the alkoxylated alkylphenol amines may also be combined with other organic corrosion inhibiting systems to produce excellent results.

Metal equipment can be protected through the use of the corrosion inhibiting solutions of the present invention by contacting metal with an effective amount of inhibiting solution containing the alkoxylated alkylphenol amines of the instant formula or the reaction product of said amines and an organic acid in a continuous exposure treatment. Solution concentration for continuous exposure treatment preferably should be in the range of about 3 ppm to about 200 ppm. For batch treatment, solution concentrations hould be in the range of about 2% to about 20% by volume.

DETAILED DESCRIPTION

Perhaps the most costly problem in an oil field environment is corrosion of piping and equipment due to sweet and sour corrosion. It has been discovered that the additions of small amounts of a particular group of ethoxylated, propoxylated alkylphenol amines effectively inhibits corrosion from both carbon dioxide and hydrogen sulfide.

Although this invention comprises corrosion inhibiting solutions containing about 2 ppm to about 70% by volume of the instant amine, the amine is preferably delivered to the corrosion sites in a continuous treating solution containing about 3 ppm to about 200 ppm of the amine having the formula

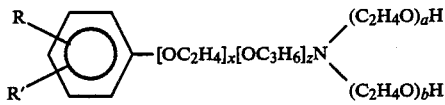

wherein R is hydrogen or an alkyl group containing about 5 to about 12 carbon atoms, R' is an alkyl group containing about 5 to about 12 carbon atoms, x equals about 1 to about 20, z equals about 1 to about 20, a equals about 1 to about 20, and b equals about 1 to about 20. A batch treating solution with an amine concentration of about 2% to about 20% by volume is also effective.

The instant amines most preferred for use in the invention corrosion inhibiting solutions are those amines of the given formula wherein either R or R' is an alkyl group containing about 7 to about 10 carbon atoms, x equal about 4 to about 10, z equals about 2 to about 5, a equals about 1 to about 20, and b equals about 1 to about 20. The alkyl groups containing about 5 to about 12 carbon atoms are necessary to add non-polar material to the compound. The elimination of the alkyl groups makes the compounds too hydrophilic. It is believed that there would not be enough non-polar material to keep the aqueous phase off the metal, if the alkyl groups were absent. When R and R' are both alkyl groups, water solubility dramatically decreases.

The isomeric positions of the alkyl groups and the chain of alkylene oxide groups on the aromatic ring are thought to be unimportant. The method of synthesis of the amine will most likely determine the positions of aromatic ring substituents.

The structure of the amine may be varied to tailor the compound to individual requirements. When few ethylene oxide groups are employed in the compound, the compound loses some water solubility. It may be necessary to employ a mixed brine and organic solvent. As the number of propylene oxide groups increases, the compound becomes more oil soluble and less water soluble.

The amine compounds used in the invention corrosion systems may be prepared by the reaction of ethylene and propylene oxide with an alkylphenol in varying ratios. The resulting compound is then subjected to reductive amination in the presence of ammonia and hydrogen to produce the instant amine.

The invention solution may be employed in both general methods of inhibiting solution treatment, continuous injection and batch. Either method, continuous injection or batch, permits the organic inhibitor solution containing the instant alkoxylated amine to contact the metal to be protected and form an organic barrier over the metal.

The effectiveness of a given organic inhibitor system generally increases with the concentration, but because of cost considerations, most solutions when fully diluted in their working environment must be effective in quantities of less than about 0.01% by weight (100 ppm). The invention solution is effective throughout the range of about 3 ppm to about 200 ppm in a continuous injection method, with higher concentrations generally producing greater protection. Although it may not be cost effective, the invention inhibiting solution may be employed in the field with 1% by volume of the amine or acid/amine reaction product.

If a batch method is employed, a slug of inhibiting solution containing the instant alkoxylated amine should be injected into a closed system with a concentration of preferably about 2% to about 20% by volume of inhibiting solution in diluent. The diluted inhibiting solution should be allowed to remain in contact with the metal to be protected for sufficient time to form a durable film. The contact time period is about 2 to about 24 hours, preferably at least 12 hours, most preferably 24 hours. Afterwards, normal production or flow of fluids should be resumed, flushing out excess inhibitor solution. The batch treatment should be repeated when necessary to maintain film durability over the metal to be protected.

It is desirable to store and transport the invention corrosion inhibiting solution with higher amine or organic acid reaction product concentrations, such as about 1% to about 70% by volume, preferably about 15% to about 60% by volume of the solution. The acid/amine reaction products are generally less soluble in water than the amines of the instant formula. But all are dispersible in water alone at the treating concentrations of about 2 ppm to about 20%. The preferred solvent environment is a mixed water and organic solvent. Although these corrosion inhibitors generally work best in brine or mixed organic and brine environments, transportation and storage solutions can be either organic solvent or mixed organic and water solvent.

When higher concentrations are used for storage an transportation, it may be necessary to add some alcohol to the water solvent to maintain the active ingredient in solution. With only water as a solvent at these higher concentrations, settling problems may occur which would make dilution and use in the field quite difficult. For handling ease and to save volume and shipping costs, concentrations are preferably about 15% to about 70% water, about 5% to about 70% alcohol, and about 15% to about 60% of active ingredient by volume of solution.

In higher concentrations of about 15% to about 60% by volume of the instant amine, it is preferred tha the solvent contain at least some portion of a lower molecular weight alcohol to maintain solubility, or at least dispersion, of the amine. This avoids physical handling problems in the field. Practically any alcohol may be used as a solvent, but lower molecular weight alcohols are preferred, primarily because of their low cost. Isopropanol, methanol, and ethylene glycol are three of the most preferred alcohol solvents.

For example, a drum containing a solution of 25% by volume of the instant amine in 75% solvent should preferably have a solvent system of at least 15% alcohol in 85% water. With the water to alcohol ratio of 90/10, solubility may be achieved, but phase separation may occur. Thus, a water/alcohol ratio of at least 85/15 is desired.

Isopropanol is a preferred alcohol solvent because of its cost. Methanol, ethanol, propanol, butanol and pentanol may all be used. Ethylene glycol and propylene glycol are also preferred alcohol solvents because they can be mixed with isopropanol or the other alcohols to lower the flash point and pour point of the solution. Consequently, a representative concentrated solution might be 15% amine in a 75% solvent of 5% isopropanol, 15% ethylene glycol and 55% water. Of course, much larger amounts of alcohol may be employed, but water is preferred because of its cost.

The ethoxylated, propoxylated alkylphenol amine may be placed in a solvent system as is, or reacted with an acid selected from the group consisting of hydroxyacetic acid, a fatty acid, a dicarboxylic acid, a dimer-trimer acid, an acidic phosphorus containing compound, mineral acids or mixtures thereof. Organic acids are preferred. When this acid/amine reaction is carried out at ambient temperature, a salt is formed which is effective in controlling corrosion when employed in approximately the same concentrations as the alkoxylated alkylphenol amine itself, preferably about 3 ppm to about 200 ppm in continuous treatment, or about 2% to about 20% by volume in batch treatment.

The organic acid and amine are reacted in the stoichiometric proportions of about 0.65/1 acid/amine ratio to about 1/0.6 acid/amine ratio, most preferably about 0.9/1 to about 1/0.7 acid/amine ratio. Formulations with excess acid are preferred because of cost considerations.

Viscosity problems were encountered with some 1/1 acid/amine reaction products and increased as the acid/amine ratio decreased. These can be solved by adding a small amount of a viscosity reducing additive to the solution, such as a low molecular weight sulfonate.

The organic acids preferred for reaction with the amine of the instant formula are hydroxyacetic acid, fatty acids having about 16 to about 20 carbon atoms, dicarboxylic acids having about 19 to about 23 carbon atoms, various dimer-trimer acids, and phosphate esters having a alkylphenol group with about 2 to about 20 ethylene oxide groups which behave like acids. Other acidic phosphorus containing compounds such as phosphonates may also be used to good effect.

Examples of the organic acids include: Pamak WCFA, a trademarked fatty acid having about 16 to 18 carbon atoms and an acid number of 178 sold by Hercules, Inc.; Arizona 7002, a trademarked dimer-trimer acid with an acid number of 142 sold by Arizona Chemical Co.; Emery 1022, a trademarked dimer-trimer acid having about 80% dimer acid and 20% trimer acid, sold by Emery Industries and having an equivalent weight of 291; Diacid 1550, a trademarked dicarboxylic acid having about 21 carbon atoms and an equivalent weight of about 303 sold by Westvaco Corp.; Century D-75, a trademarked dimer-trimer acid with about 16 to about 18 carbon atoms and an equivalent weight of 379 sold by Union Camp Corp. (Century D-75 averages about 24% monomer, 33% dimer, and 43% trimer or higher); Westvaco L-5, a trademarked tall oil fatty acid having about 16 to 18 carbon atoms and equivalent weight of 295 sold by Westvaco Corp.; Wayfos M-100, a trademarked organic phosphate ester with an nonylphenol group having 10 ethylene oxide groups and an equivalent weight of about 416 sold by Phillip A Hunt Chemical corp; Wayfos D-10N, a trademarked organic phosphate ester with an equivalent weight of about 625 sold by Phillip A. Hunt Chemical Corp.; and glycolic acid.

The amine of the formula can also be reacted with an acidic phosphorus containing compound which at low concentrations of about 3 ppm to about 200 ppm is effective in controlling scale as well as sour and sweet corrosion. Two examples of such compounds are phosphonates and phosphate esters.

A monoalkylphenol amine was reacted with Wayfos M-100, a phosphate ester with a nonylphenol group having ten ethylene oxide groups. The reaction product gave over 90% inhibition against scale and sour corrosion and over 85% inhibition against sweet corrosion all at concentrations below 50 ppm. In fact, 92% calcium sulfate scale inhibition was achieved at only 13 ppm. The amine/phosphate ester salt prevented scale but the amines alone were ineffective.

The corrosion inhibiting solutions of the invention which contain the instant ethoxylated, propoxylated alkylphenol amines may be employed in different locations in the oil field. Since the solutions offer substantial improvement over present inhibitor systems, they may be used to protect downhole piping and equipment in situations such as subsurface water injection for pressure maintenance, water disposal systems or drilling and production applications, as well as in above-ground, oil or water flow lines and equipment.

The invention solution may be employed to inhibit corrosion by continuous injection or batch treatment. In a continuous injection treatment, the active ingredient of the corrosion inhibiting solution is maintained at the required levels of treatment, preferably about 5 ppm to about 300 ppm, in areas where corrosive fluids contact the metallic parts desired to be protected. In a batch treatment, the instant corrosion inhibiting system is injected at a concentration of about 2% to about 20%, and allowed to contact the metal to be protected for preferably at least 12 hours, most preferably at least 24 hours, before being exposed to production fluids.

At present, an industry established procedure for testing oil field corrosioninhibitors does not exist. because of widely varying corrosion conditions in the oil field, it is impractical to establish a universal standard laboratory test. but it is desirable to have tests that are easily duplicated and can approximate the continuous type of liquid and gas exposure that occurs in wells and flow lines in the oil field. One test simulating field usage has achieved some following in the industry. The continuous exposure procedure set forth in January 1968 issue of "Material Protections" at pages 34-35 was followed to test the subject invention. The test offers an excellent indication of the ability of corrosion inhibitors to protect metals immersed in either sweet or sour fluids.

A second test was generally followed for evaluating scale inhibition against gypsum or calcium sulfate deposition. The test is described in detail in "Corrosion", Vol. 17 (5), pp 232-236 (1961) with modifications described below.

The following examples will further illustrate the novel corrosion treating solutions of the present invention containing said alkoxylated alkylphenol amines. These examples are given by way of illustration and not as limitations on the scope of the invention. Thus, it should be understood that materials present in the corrosion treating solutions may be varied to achieve similar results within the scope of the invention.

EXAMPLES

General Test Procedure

The metal specimens were immersed in sweet or sour fluid environments for seventy-two (72) hours to approximate continuous exposure conditions in the oil field. The sweet fluid test environment was established by gassing the test solution with carbon dioxide. A sour fluid test environment was created by bubbling hydrogen sulfide through the test solution. The specimens were tested in both carbon dioxide and hydrogen sulfide environments with and without the claimed amines.

The metal test specimens were cold-rolled, mild steel coupons which measured 3 inches by 0.5 inches by 0.005 inches. These coupons were initially cleaned in order to remove any surface film, dried and then weighted.

Four ounce glass bottles were filled with two types of test solutions. the first simulated an oil-brine environment and consisted of 10 milliliters of depolarized kerosene, 90 milliliters of a 10% synthetic brine and 1 milliliter of dilute (6%) acetic acid. The synthetic brine contained 10% sodium chloride and 0.5% calcium chloride by weight. The second test solution simulated a brine environment and was composed of 100 milliliters of the same 10% synthetic brine and 1 milliliter of dilute acetic acid. The oil-brine and brine test solutions were then gassed for 5 to 10 minutes with carbon dioxide to create a sweet test environment or hydrogen sulfide to create a sour test environment. The solution gassing was designed to remove any dissolved oxygen as well as create the sweet or sour environment. Next, a measured concentration of the amine or acid/amine reaction product was placed in the bottles.

The steel test coupons were then placed within the bottles. The bottles were capped and mounted on the spokes of a 23 inch diameter, vertically mounted wheel and rotated for 72 hours at 30 rpm inside an oven maintained at 49° C. The coupons were removed from the bottles, washed and scrubbed with dilute acid for cleaning purposes, dried and weighed. The corrosion rate in mils per year (mpy) was then calculated from the weight loss. One mpy is equivalent ot 0.001 inches of metal lost per year to corrosion. Additionally, the test coupons were visually inspected for the type of corrosive attack, e.g., hydrogen blistering, pitting and crevice corrosion or general corrosion.

The laboratory tests for calcium sulfate scaling were performed with the testing apparatus of the "Corrosion" article mentioned above, the disclosure of which is incorporated herein by reference. The procedure discussed in the Corrosion Article was loosely followed, with some differences as noted below. The apparatus deposits scale on heated stainless steel rotors that turn in water solutions of the scale forming minerals of calcium sulfate. Cylindrical electric heaters were mounted in the shafts to fit inside the rotor tubes which are slip fitted onto the shafts. A chain and pulley arrangement drove the rotor shafts from the variable speed motor. Line voltage for the variable speed motor was controlled by a variable transformer and a rheostat was employed to control the heaters.

In preparation for the tests, the rotors were cleaned with steel wool, rinsed with deionized water and acetone, and dried. Just prior to use, the rotors were filmed with a dilute stearic acid solution (1000 ppm in toluene) and dried. Beakers containing the scaling solutions were placed in position to submerge the rotors. The surface of the scaling solution was finally covered with mineral oil to prevent evaporation. Rotation of the rotors was commenced and the test conducted at about 105° F. for 10-16 hours.

Two separate stock solutions were prepared and mixed to yield the final scaling test solution. One solution (Solution A) contained 468 g NaCl, 121.5 g $CaCl_2 \cdot 2H_2O$, and 9722 ml of deionized water. The second solution (Solution B) contained 130.05 g of anhydrous $Na_2SO_4$ diluted to one liter with deionized water. Utilizing these amounts yielded test solutions which contained 50,000 ppm NaCl and 10,000 ppm $CaSO_4$.

Each beaker in a scaling test contained 440 ml of Solution A, 40 ml of Solution B and sufficient inhibitor diluted into 20 ml of deionized water to yield the desired test concentration. For example, to obtain a 10 ppm inhibitor concentration, 5 ml of 1000 ppm inhibitor stock solution and 15 ml of deionized water would be added to the test beaker.

Upon completion of the tests, the rotors were removed from the test apparatus, rinsed with acetone, and dried. The scale adhering to the rotors was scraped off the rotor surface and then weighed. Percent inhibition was determined by comparing the amount of deposition in uninhibited solutions (blanks) to the amount in inhibited solutions. A standard value of 1.5001 g $CaSO_4$ was used for the blank.

EXAMPLES 1-4

An ethoxylated, propoxylated alkylphenol amine of the claimed formula, wherein R is hydrogen, R' is an alkyl group containing 9 carbon atoms, x equals 4, z equals 2-3, and a+b equals 4.5, was employed to test the corrosion inhibition systems of Examples 1-3. The example 1 system contained 7.5 ppm of the amine, whereas Examples 2-3 contained 16 ppm of the salt reaction products. Two salts were prepared by reacting the above amine in a 1/1 ratio with Westvaco L-5 for Example 2 and glycolic acid for Example 3. Example 4 runs were made without corrosion inhibitor for comparison purposes. The results are listed below in Table I.

TABLE I

| | Corrosion Rate (mils per year) 16 ppm Inhibitor Continuous Treatment | | | |
| | Sweet | | Sour | |
| Example | Oil/brine | brine | Oil/brine | brine |
| --- | --- | --- | --- | --- |
| 1 (7.5 ppm) | 3.4 | 2.0 | 2.8 | 2.0 |
| 2 | 4.72 | 3.40 | 4.96 | 2.40 |

TABLE I-continued

| | Corrosion Rate (mils per year) 16 ppm Inhibitor Continuous Treatment | | | |
|---|---|---|---|---|
| | Sweet | | Sour | |
| Example | Oil/brine | brine | Oil/brine | brine |
| 3 | 6.16 | 16.92 | 4.72 | 6.04 |
| 4 (Blank) | 12.2 | 13.6 | 50.8 | 55.2 |

The Example 1 amine alone provided excellent sour corrosion inhibition with about 95% protection in each test. Good carbon dioxide inhibition of 85% was also provided in a brine environment.

The Example 2 inhibitor salf prepared with Westvaco L-5 performed admirably. Hydrogen sulfide corrosion inhibition (sour) was over 90% for an oil/brine environment and over 95% for a brine environment. The Example 3 inhibitor also gave 90% inhibition in sour environments.

EXAMPLES 5-17

Examples 5-17 involved inhibitor systems prepared with two different ethoxylated, propoxylated alkylphenol amines. Although these are not the claimed alkylphenol amines, it has been discovered that the claimed alkylphenol amines have behavior analogous to these compounds tested in Examples 5-17, except for the fact that amide derivatives cannot be prepared from the ethoxylated compounds claimed herein. The addition of the ethoxylation groups attached to the nitrogen makes the invention compounds more water soluble.

Inhibitor A in these examples is an amine having a structure similar to the instant formula is that R is an alkyl group having 9 carbon atoms, R' is hydrogen, x is about 9.5 and z is about 3, but there are no ethoxylation groups on the nitrogen. Inhibitor B in the examples denotes an amine of the Inhibitor a formula wherein R is an alkyl group with 9 carbon atoms, R' is hydrogen, x is about 4 and z is about 3.

Examples 5-10 were tested in the sweet environment under two different fluid conditions, an oil-brine fluid and a brine fluid composed as described above. Each inhibitor was reacted with an acid to produce a salt or amide which was then placed in the oil-brine or brine fluid at concentrations of 8 ppm and 16 ppm. Percentage reduction in corrosion can be calculated by subtracting the results of Table II from the corrosion rates without any corrosion inhibiting solution (blank) which are given in Example 11, dividing the difference by the blank value and multiplying by 100. Most examples provided greater than 80% protection in the sweet environment.

TABLE II

| | | Continuous Sweet Tests (mpy) | | | |
|---|---|---|---|---|---|
| | | Oil-Brine | | Brine | |
| | Inhibitor | 8 ppm | 16 ppm | 8 ppm | 16 ppm |
| Ex. 5 | Westvaco L-5 plus Inhibitor A in a 1/1 Acid/Amine Ratio | 4.48 | 2.64 | 2.60 | 2.20 |
| Ex. 6 | Century D-75 plus Inhibitor A in a 1/1 Acid/Amine Ratio | 1.48 | 0.80 | 3.48 | 2.40 |
| Ex. 7 | Diacid 1550 plus Inhibitor A in a 1/1 Acid/Amine Ratio | 1.36 | 1.00 | 3.24 | 2.88 |
| Ex. 8 | Wayfos M-100 plus Inhibitor A in a 1/1 Acid/Amine Ratio | 1.96 | 1.40 | 4.00 | 3.84 |
| Ex. 9 | Westvaco L-5 plus Inhibitor A in a 1/0.75 Acid/Amine Ratio | 6.68 | 4.28 | 2.76 | 2.92 |
| Ex. 10 | Westvaco L-5 plus Inhibitor A in a 1/1 Acid/Amine Ratio | — | 2.80 | — | 2.16 |
| Ex. 11 | None | | 12.2 | | 13.6 |

Examples 12 and 13 were multiple tests performed on two inhibitor systems in a sweet corrosion environment at different inhibitor concentration levels. All of these tests were performed in a brine environment which was comprised of 100 ml brine and 1 ml of dilute acetic acid. The blank corrosion rate without any organic inhibitor was 13.6 mpy. Table III lists the results.

TABLE III

| | | Continuous Sweet Tests In Brine (mpy) | | | | |
|---|---|---|---|---|---|---|
| | Inhibitor | 3 ppm | 7 ppm | 16 ppm | 33 ppm | 83 ppm |
| Ex. 12 | Inhibitor A | 5.44 | 5.00 | 3.92 | 3.28 | 3.20 |
| Ex. 13 | Westvaco L-5 plus Inhibitor A in a 1/0.75 ratio | 4.80 | 3.48 | 3.04 | 2.64 | 2.24 |

Table III indicates that the salt formed by the reaction of the instant amine and the tall oil fatty acid was much more effective in preventing corrosion in the sweet environment than the amine alone. At 16 ppm the protection level for the salt reached 78%. At higher concentrations of inhibitor, much greater protection was obtained.

EXAMPLES 14-16

The amines identified as Inhibitor A and Inhibitor B were tested in a sour environment for inhibition of hydrogen sulfide corrosion. Table IV below lists the results.

TABLE IV

| | | Continuous Sour Tests (mpy) | | | | |
|---|---|---|---|---|---|---|
| | Inhibitor | 3 ppm | 7 ppm | 16 ppm | 33 ppm | 83 ppm |
| Ex. 14 | Inhibitor A | 4.68 | 2.64 | 2.60 | 2.52 | 2.48 |
| Ex. 15 | Inhibitor B | 3.00 | 2.40 | 4.20 (holes) | 4.08 (holes) | 2.92 |
| Ex. 16 | None | | | 55.2 mpy | | |

Excellent results were achieved in hydrogen sulfide corrosion control with the use of Inhibitors A and B. Once the concentration of the inhibitor was raised to 7 ppm or better, hydrogen sulfide corrosion was almost completely eliminated. Corrosion protection rates were 95% or better for almost every concentration greater than 7 ppm for both Inhibitors A and B. At the remarkably low and cost efficient concentration of 7 ppm, 95.2% protection was achieved with Inhibitor A and 95.7% protection was achieved with Inhibitor B. Problems existed with the tests at 16 ppm and 33 ppm for Inhibitor B. Holes and high corrosion rates were observed in the coupons. It is believed that air probably contaminated these two test bottles and ruined the tests.

EXAMPLE 17

Wayfos M-100, a trademarked phosphate ester with a nonylphenol group having 10 ethylene oxides groups sold by Phillip A. Hunt Chemical Corp., was reacted with Inhibitor a to produce a salt compound that was quite effective in calcium sulfate scale control The scaling test described at the beginning of the examples was followed in the laboratory to produce the results of Table V at different concentrations.

TABLE V

| | CaSO₄ Scaling Tests (% Inhibition) | | | | | | |
|---|---|---|---|---|---|---|---|
| | 1 ppm | 2 ppm | 3 ppm | 5 ppm | 7 ppm | 8 ppm | 13 ppm |
| Ex. 17 | 0% | 0% | 27.5% | 49.9% | 64.3% | 82.2% | 92% |

The combination of Inhibitor A and the organic phosphate produce superior calcium sulfate scale control at low concentrations. Ninety-two percent protection against calcium sulfate scale was achieved at only 13 ppm concentration of inhibitor. Although the compound was only tested for calcium sulfate scale inhibition, it is believed to be also effective against calcium carbonate scale. Compounds that are this effective against calcium sulfate scale are almost always effective in carbonate scale control.

Other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A water soluble to water-dispersible corrosion inhibiting solution comprising:
   a solvent of water; and
   about 2 ppm to about 20% by volume of an ethoxylated, propoxylated alkyphenol amine in a solvent, said amine represented by the formula

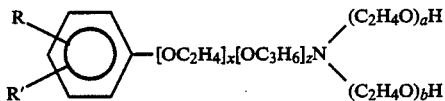

wherein R is hydrogen or an alkyl group containing about 5 to about 12 carbon atoms, R' is an alkyl group containing about 5 to about 12 carbon atoms, x equals about 1 to about 20, z equals about 1 to about 20, a equals about 1 to about 20, and b equals about 1 to about 20.

2. The corrosion inhibiting solution of claim 1, wherein the water is a brine.

3. the corrosion inhibiting solution of claim 1, further comprising a mixed solvent of organic solvent and water.

4. The corrosion inhibiting solution of claim 1, wherein R and R' are alkyl groups containing about 7 to about 10 carbon atoms, x equals about 4 to about 10, and z equals about 2 to about 5.

5. The corrosion inhibiting solution of claim 1, wherein the concentration of said amine is about 3 ppm to about 200 ppm.

6. A water soluble to water-dispersible corrosion inhibiting solution comprising:
   a solvent; and
   about 2 ppm to about 20% by volume of the reaction product salt of an organic acid selected from the group consisting of hydroxyacetic acid, a fatty acid, a dicarboxylic acid, an acidic phosphorus containing compound, a dimer-trimer acid, and mixtures thereof, with an ethoxylated, propoxylated alkylphenol amine represented by the formula

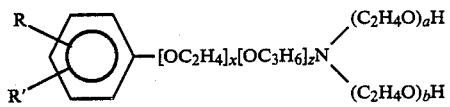

wherein R is hydrogen or an alkyl group containing about 5 to about 12 carbon atoms, R' is an alkyl group containing about 5 to about 12 carbon atoms, x equals about 1 to about 20. z equals about 1 to about 20, a equals about 1 to about 20 and b equals about 1 to about 20.

said organic acid and amine reacted in the proportions of about 0.65/1 acid to amine to about 1/0.6 acid to amine.

7. The corrosion inhibiting solution of claim 6, wherein the solvent is water.

8. The corrosion inhibiting solution of claim 7, wherein the solvent is brine.

9. The corrosion inhibiting solution of claim 6, wherein the solvent is an organic solvent and brine mixture.

10. The corrosion inhibiting solution of claim 6, wherein R and R' are alkyl groups containing about 7 to about 10 carbon atoms, x equals about 4 to about 10, and z equals about 2 to about 5.

11. The corrosion inhibiting solution of claim 6, wherein the concentration of said acid/amine reaction product is about 3 ppm to about 200 ppm.

12. The corrosion inhibiting solution of claim 6, wherein the organic acid and amine are reacted in the proportions of about 0.9/1 acid to amine ratio to about 1/0.7 acid to amine ratio.

13. The corrosion inhibiting solution of claim 6, wherein the acid is a dicarboxylic acid having about 19 to about 23 carbon atoms.

14. The corrosion inhibiting solution of claim 6, wherein the acid is a fatty acid having about 16 to about 20 carbon atoms.

15. The corrosion inhibiting solution of claim 6, wherein the acid is a dimer-trimer acid having about 32 to about 54 carbon atoms.

16. The corrosion inhibiting solution of claim 6, wherein the acidic phosphorus containing compound is a phosphate ester having an alkylphenol group with about 2 to about 20 ethylene oxide groups or a phosphonate.

17. The corrosion inhibiting solution of claim 6, further comprising a relatively low molecular weight sulfonate as a viscosity decreasing additive.

18. A water soluble to water-dispersible corrosion inhibiting solution comprising:
   a solvent; and
   about 3 ppm to about 200 ppm by volume of the reaction product salt of an organic acid selected from the group consisting of hydroxyacetic acid, a fatty acid, a dicarboxylic acid, an acidic phosphorus containing compound, a dimer-trimer acid and mixtures thereof with an ethoxylated, propoxylated alkylphenol amine represented by the formula

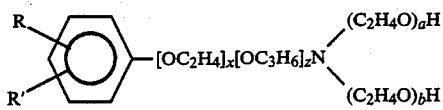

wherein R and R' are alkyl groups containing about 7 to about 10 carbon atoms, x equals about 4 to about 10, z equals about 2 to about 5, a equals about 1 to about 20, and b equals about 1 to about 20, said organic acid and amine reacted in the proportions of about 0.9/1 acid to amine to about 1/0.7 acid to amine.

19. A water soluble to water-dispersible corrosion inhibiting solution comprising:
about 1% to about 99% by volume of water;
about 0% to about 99% by volume of an alcohol; and
about 1% to about 70% by volume of an ethoxylated, propoxylated alkylphenol amine, said amine represented by the formula

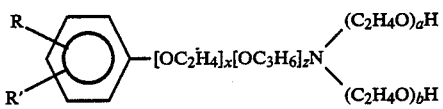

wherein R is hydrogen or an alkyl group containing about 5 to about 12 carbon atoms, R' is an alkyl group containing about 5 to about 12 carbon atoms, x equals about 1 to about 20, z equals about 1 to about 20, a equals about 1 to about 20, and b equals about 1 to about 20.

20. The corrosion inhibiting solution of claim 19, wherein water comprises about 15% to about 70% by volume of the solution, alcohol comprises about 5% to about 20% by volume of the solution, and said amine comprises about 155 to about 60% by volume of the solution.

21. The corrosion inhibiting solution of claim 19, wherein R and R' are alkyl groups containing about 7 to about 10 carbon atoms, x equals about 4 to about 10, and z equals about 2 to about 5.

22. The corrosion inhibiting solution of claim 19, wherein the alcohol is selected from the group of alcohols consisting of methanol, ethanol, propanol, isopropanol, butanol, pentanol, ethylene glycol, propylene glycol, and mixtures thereof.

23. The corrosion inhibiting solution of claim 22, wherein the alcohol is a mixture of isopropanol and ethylene glycol.

24. A water soluble to water-dispersible corrosion inhibiting solution comprising:
about 0% to about 99% by volume of water;
about 0% to about 99% by volume of an alcohol; and
about 1% to about 70% by volume of the reaction product salt of an organic acid selected from the group consisting of hydroxyacetic acid, a fatty acid, a dicarboxylic acid, a dimer-trimer acid, an acidic phosphorus containing compound, and mixtures thereof, with an ethoxylated, propoxylated alkylphenol amine, said amine represented by the formula

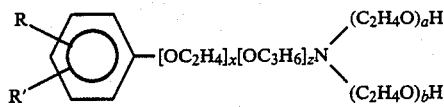

wherein R is hydrogen or an alkyl group containing about 5 to about 12 carbon atoms, R' is an alkyl group containing about 5 to about 12 carbon atoms, x equals about 1 to about 20, z equals about 1 to about 20, a equals about 1 to about 20, and b equals about 1 to about 20, said organic acid and amine reacted in the proportions of about 0.65/1 acid to amine to about 1/0.6 acid to amine.

25. The corrosion inhibiting solution of claim 24, wherein water comprises about 15% to about 70% by volume of the solution, alcohol comprises about 5% to about 70% by volume of the solution, and said acid/amine reaction product comprises about 15% to about 60% by volume of the solution.

26. The corrosion inhibiting solution of claim 24, wherein R and R' are alkyl groups containing about 7 to about 10 carbon atoms, x equals about 4 to about 10, and z equals about 2 to about 5, a equals about 1 to about 20, and b equals about 1 to about 20.

27. The corrosion inhibiting solution of claim 24, wherein the alcohol is selected from the group of alcohols consisting of methanol, ethanol, propanol, isopropanol, butanol, pentanol, ethylene glycol, propylene glycol, and mixtures thereof.

28. The corrosion inhibiting solution of claim 27, wherein the alcohol is a mixture of isopropanol and ethylene glycol.

29. A method of protecting metals from corrosive agents in hydrocabon and aqueous fluids which comprises contacting metal with an effective amount of a compound represented by the formula

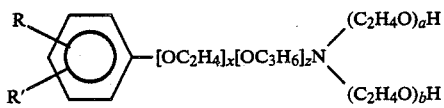

wherein R is hydrogen or an alkyl group containing about 5 to about 12 carbon atoms, R' is an alkyl group containing about 5 to about 12 carbon atoms, x equals about 1 to about 20, z equals about 1 to about 20, a equals about 1 to about 20, and b equals about 1 to about 20.

30. The method of claim 29, wherein said compound is mixed with fluids so that a concentration of about 3 ppm to about 200 ppm of said compound continuously contacts the metal.

31. The method of claim 29, wherein said compound is mixed with fluids so that a concentration of about 2% to about 20% by volume of said compound contacts the metal in a batch treatment for about 2 to about 24 hours.

32. A method of protecting metals from corrosive agents in hydrocarbon and aqueous fluids which comprises contacting metal with an effective amount of the reaction product salt of an organic acid selected from the group consisting of hydroxyacetic acid, a fatty acid, a dicarboxylic acid, a dimer-trimer acid, an acidic phosphorus containing compound, and mixtures thereof, with an amine compound represented by the formula

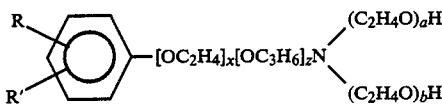

wherein R is hydrogen or an alkyl group containing about 5 to about 12 carbon atoms, R' is an alkyl group containing about 5 to about 12 carbon atoms, x equals about 1 to about 20, z equals about 1 to about 20, a equals about 1 to about 20, and b equals about 1 to about 20, said organic acid and amine reacted in the proportions of about 0.65/1 acid/amine to about 1/0.6 acid to amine.

33. The method of claim 32, wherein said acid/amine reaction product is mixed with fluids so that a concentration of about 3 ppm to about 200 ppm of said compound continuously contacts the metal.

34. The method of claim 32, wherein said acid/amine reaction product is mixed with fluids so that a concentration of about 25 to about 20% by volume of said product contacts the metal in a batch treatment for about 2 to about 24 hours.

UNITED STATES PATENT AND TRADEMARK OFFICE
CERTIFICATE OF CORRECTION

PATENT NO. : 4,867,888

DATED : September 19, 1989

INVENTOR(S) : Frederick William Valone

It is certified that error appears in the above-identified patent and that said Letters Patent is hereby corrected as shown below:

Claim 19, Line 3 should read --about 0% to about 99% by volume of water--.

Claim 20, line 5 should read --comprises about 15% to about 60% by volume of the--.

Signed and Sealed this

Eleventh Day of September, 1990

Attest:

HARRY F. MANBECK, JR.

Attesting Officer     Commissioner of Patents and Trademarks